Oct. 12, 1926.
B. S. HARRIS
1,602,529
COMBINED CULTIVATOR AND SEEDER
Filed Oct. 29, 1924      2 Sheets-Sheet 1
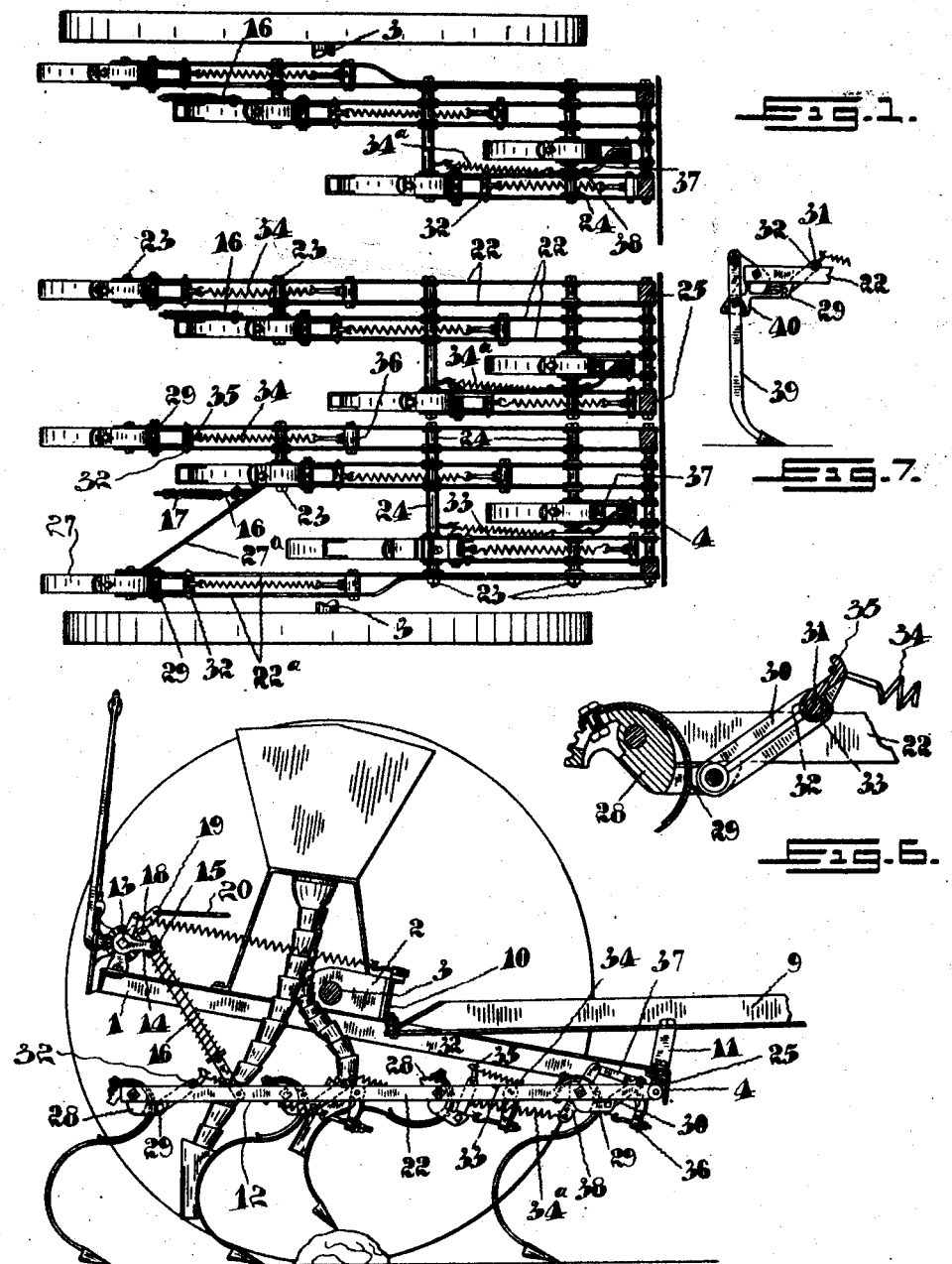
INVENTOR.
B. S. Harris.
BY J. Edward Maybee.
ATTY.

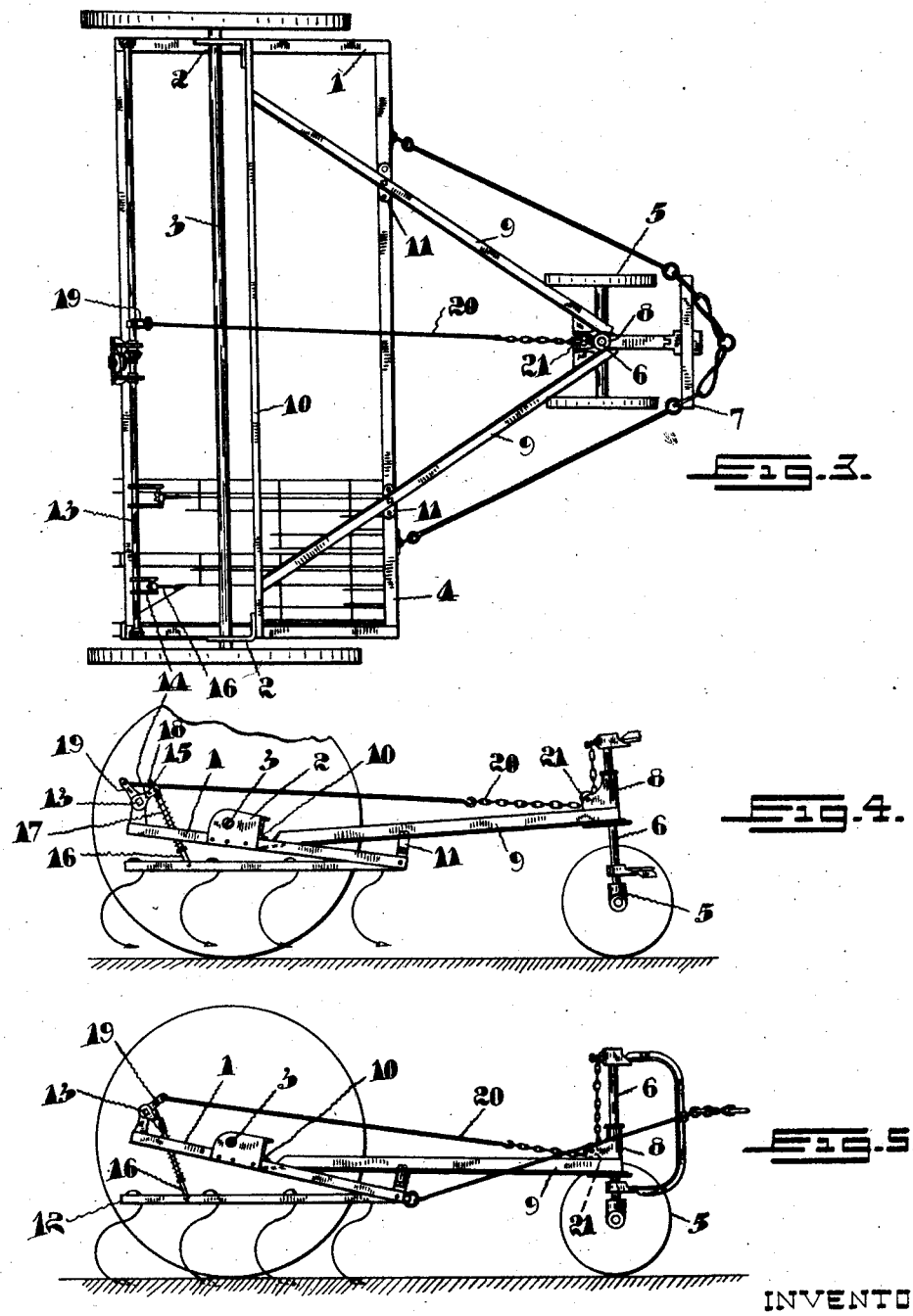

Patented Oct. 12, 1926.

1,602,529

UNITED STATES PATENT OFFICE.

BURTON S. HARRIS, OF TORONTO, ONTARIO, CANADA, ASSIGNOR TO MASSEY-HARRIS COMPANY, LIMITED, OF TORONTO, CANADA.

COMBINED CULTIVATOR AND SEEDER.

Application filed October 29, 1924. Serial No. 746,685.

This invention relates to cultivators and seed or seed and fertilizer drills employing tines arranged in a plurality of rows on a plurality of floating frames pivotally connected with the frame of the apparatus. In such an arrangement, if any one tooth meets and rides over an obstruction, all the other teeth of the same section lift, which is objectionable. It has been proposed to overcome this difficulty by employing spring tines which, within certain limits, are capable of rising over small obstructions, but which, owing to their yielding being mainly in a backward direction, do not lift sufficiently to clear large obstructions.

The object of the present invention therefore is to provide means whereby the defect in cultivators and seeders of the type referred to is overcome. This object is attained by pivotally connecting each tine to its float frame, and providing it with releasable locking means tending to hold it to its work, said locking means being normally held in locked position by spring pressure.

The present invention also relates to the specific arrangement of the connections of the tines, and to the construction and arrangement of the main frame and the float frames carrying the tines substantially as hereinafter more specifically described and as illustrated in the accompanying drawings in which Fig. 1 is a plan view, partly broken away, of part of a seeder and cultivator constructed in accordance with this invention;

Fig. 2 a side elevation, of the same, partly in section;

Fig. 3 a plan view showing the frames and forecarriage;

Figs. 4 and 5 side elevations illustrating the parallel adjustment of the floating frames;

Fig. 6 a detail of the means for mounting the tines and releasably locking them in working position; and Fig. 7 a detail illustrating the substitution of a rigid tooth for a spring tooth.

1 is the main frame, which is preferably quadrangular, and provided with brackets 2, by means of which it is supported on an axle 3. This frame is inclined downwardly and forwardly to bring its front bar 4 into a convenient position for the connection of the floating frames hereinafter referred to.

A fore-carriage 5 is provided having an upwardly extending guide rod 6 supported thereon. To this guide rod is connected a draft yoke 7. On the guide 6 a slide 8 is vertically movable. To this slide is connected the apex of a triangular frame 9, the base 10 of which is connected to the brackets 2 and thereby with the quadrangular main frame 1. By means of brackets 11, this triangular frame is also connected with the front bar 4 of the main frame. While it is preferable that the base 10 of the triangular frame should extend from side to side, yet the central part thereof may be omitted without departing from the spirit of the invention.

The floating frames 12 are constructed as hereinafter described, and are hingedly connected with the front bar 4 of the main frame. Means are provided for simultaneously lifting or applying pressure to these floating frames, and also for insuring that their adjustment will be with a substantially parallel motion. For this purpose a rock shaft 13 is journalled on the main frame, and which will be provided with the usual hand lever. Rock arms 14, connected to this shaft, are pivotally connected with sleeves 15, slidable on pressure rods 16, which are forked at their lower ends and pivotally connected with the floating frames. Coil springs 17 placed on these rods engage the sleeves, so that by the operation of the rock shaft, pressure may be applied to these springs to yieldingly press the floating frames downwardly. A pin 18 passed through each rod above the sleeve provides engagement, whereby the sleeves, when moved upwardly by the operation of the rock shaft, may raise the floating frames. The mechanism just described swings the folding frames up and down on an axis located at or adjacent to the front bar 4 of the main frame. To secure the parallel motion hereinbefore referred to, it is therefore necessary to raise or lower this front bar simultaneously with the swinging of the rock arms. This result is obtained by vertically adjusting the slide 8 on the guide 6 of the fore-carriage. For this purpose a rock arm 19 is provided on the rock shaft 13. A flexible connection 20 is led from this rock arm round the guide pulley 21 on the slide 8, and is secured to the upper end of the guide 6, as shown particularly in Figures 3, 4 and 5, thus, when the rock shaft 13 is rocked to depress the rear ends of the floating frames, the front bar of the main frame is correspondingly lowered, and, when the floating frames are swung upwardly the front bar is correspondingly raised. The desired parallel movement of the floating frames is thus obtained.

The floating frames are constructed substantially as shown in Figs. 1 and 2 of the drawings. A plurality of pairs of bars 22 are provided for each floating frame. These are connected transversely, by means of bolts 23, and the spacing of the pairs of bars is maintained by means of thimbles or spacers 24 located on the bolts between the bars. The forward bolt 23 of each floating frame forms a journal and extends through lugs 25 formed on or secured to the front bar 4 of the main frame. Each folding frame is thus adapted to swing in a vertical direction as hereinbefore referred to.

The floating frames each carry a plurality of tines or teeth, each of which is pivotally connected to the floating frame to enable it to rise over obstructions which it may meet.

With the exception of the extreme right hand floating frame, all the floating frames are substantially alike, each carrying four tines, the first of which prepares the soil, the next two form furrows into which the seed or fertilizer is dropped, while the last tines on the frames co-operate in closing the furrows into which seed has been dropped. The right hand floating frame is provided with an extra tine 27 carried by an extra pair of bars 22ª, which, to give clearance to their forward ends, are brought close together, as shown in Fig. 1, instead of being spaced as are the other pairs of bars. To give lateral stiffness therefor, one of the bars 22ª is connected with a bar of an adjacent pair of bars, by means of the diagonal brace 27ª secured to suitably positioned bolts 23. A similar bringing together of the forward ends of the outer pair of bars 22 of the extreme left end of the floating plate is preferable to provide clearance at the left hand side of the apparatus, but no diagonal brace is required in connection with this particular frame.

To enable the tines to ride over obstructions which they may meet, they are supported and arranged as follows. Between each pair of bars of each floating frame is pivoted a tooth carrier or seat 28. The construction of this tooth carrier will vary according as spring tines are employed, as shown in Figs. 1, 2 and 6 of the drawings, or a rigid tooth, as shown in Fig. 7. As shown in Fig. 6, the tooth carrier or seat is of the type commonly employed in spring tooth harrows, and the spring tooth is secured thereto in the ordinary manner. Each tooth carrier, however, is provided with a pair of forwardly extending lugs 29 between which the spring tooth passes, and between the forward ends of these lugs is pivoted one end of a link 30, this pivot being thus eccentric to that connecting the spring seat with the bars 22. A pin 31 carried by the outer end of each link is provided at each end with a projection 32, preferably formed as a roller, and these rollers normally lie in shallow notches 33 formed in the upper edges of the adjacent bars 22. Each notch is so formed that a pull exerted lengthwise of a link will have a small component tending to cause the roller engaging in the notch to move out of the notch in a rearward direction. From this it follows, if the roller be held in the notch by a spring of a predetermined tension, that the tine carried by the tooth carrier, with which the particular link is connected, will be held to its work until such time as a force is applied to it sufficiently to overcome the tension of the spring which is operating at a great mechanical advantage, owing to the engagement of the roller with the notch in the manner hereinbefore referred to. As soon, however, as the roller is moved out of the notch, the spring loses its mechanical advantage, and the tooth will yield freely in a backward direction. As soon, however, as the tooth is released, the spring will draw the parts back to the normal position shown in Fig. 6, and will resume its mechanical advantage. From this construction it follows that the tines will be locked, when in their normal position, until such time as a predetermined minimum pressure against them is exceeded, after which, they will yield freely in a backward direction, enabling them to pass over obstructions which may be met. In most cases, the springs 34 are connected with hooks 35, formed on the upper ends of the links 30, and at their other ends to connections 36, bolted between the bars 32 at a suitable point in front of the link. But, as the tines are connected to the floating frames in staggered relationship and certain of the tines are very close to the front bar 4 of the main frame, a slightly different arrangement is necessary for these tines so as to avoid any forward extensions of the floating frames. For this purpose the following construction is provided. A rearwardly extending link 37 is pivotally connected with the link 30 of each of the forward tooth carriers. This link is pivotally connected at its rear end with a lever 38 fulcrumed intermediate its ends, preferably on the pivot of the seat carrier of the forward tine. The other end of this lever 38 is connected with a coil spring 34ª, the other end of which is connected with any suitable part of the floating frame, see particularly Figs. 1 and 2.

The tooth carrier shown in Fig. 7 is suitably shaped for the connection of the rigid tooth 39, being provided with lugs 40 to which the tooth is bolted.

Referring again to Fig. 6, it will be noted that the spring tooth plays between the curved tooth seat of the pivotal connection between the tooth seat and the link 30. The vibration of the tooth is thus limited in either direction, which tends to prevent breakage of the tooth due to the violent reaction after springing over an obstruction.

What I claim is:—

1. In apparatus of the class described, a tine carrying frame comprising a plurality of pairs of spaced bars secured together side by side, each pair being spaced from adjoining pairs, the adjacent pairs of bars being of various lengths; a plurality of bolts passing through two or more bars for securing them together in fixed relationship, the bars through which the bolts pass being increased in number from end to end of the frame, each pair of bars having one of the bolts passing therethrough adjacent the ends thereof; and a plurality of tines positioned in staggered relationship, each tine being positioned adjacent the ends of and between a pair of bars and carried by one of the said bolts.

2. In apparatus of the class described, a tine carrying frame comprising a plurality of pairs of spaced bars secured together side by side, each pair being spaced from adjoining pairs, the pairs of bars being of various lengths; a plurality of bolts, each bolt passing through one or more pairs of bars for securing them together in fixed relationship; and a plurality of tine carriers positioned in staggered relationship, each carrier being positioned between a pair of bars adjacent the ends thereof and connected with one of the said bolts.

3. In apparatus of the class described, a tine carrying frame comprising a plurality of pairs of spaced bars secured together side by side in spaced relationship; and a plurality of tine carriers positioned in staggered relationship and each pivotally connected with a pair of said bars co-axial with the connection between said pair and an adjacent pair or pairs; and an extra pair of bars connected by their forward parts with the other bars and having their rearward parts braced from another pair of bars by means of a diagonal brace.

4. In apparatus of the class described, an inclined main frame connected to the axle of the apparatus; a forecarriage on which the forward part of the main frame is vertically adjustable; a floating frame hinged at its forward end on the main frame intermediate of the axle and the fore-carriage; and means carried by the main frame for simultaneously swinging one end of the floating frame in a vertical plane and moving the main frame on the fore-carriage to raise the other end of the floating frame whereby a substantially parallel movement is imparted to the floating frame.

5. In apparatus constructed as set forth in claim 4 in which the means for swinging the floating frame and adjusting the main frame on the fore-carriage comprises a rock shaft journalled on the main frame; a rock arm secured to said shaft and pressure rod connecting said rock arm with the floating frame; a second rock arm secured to said shaft; a flexible connection between said second rock arm and the fore-carriage above the main frame; and a guide pulley on the main frame round which said flexible connection is led up to its point of connection with the main frame.

6. In apparatus of the class described, a quadrilateral frame secured, intermediate of its front and rear ends, to the axle of the vehicle; a triangular frame rigidly connected at its base to the quadrilateral frame adjacent the axle; a fore-carriage on which the apex of the triangular frame is vertically adjustable; and a floating frame hinged at its forward end to the front end of the quadrilateral frame, and means for simultaneously swinging the floating frame in a vertical plane on its hinge and moving the triangular frame on the fore-carriage to raise and lower the said hinge.

Signed at Toronto, Canada, this 16th day of October 1924.

BURTON S. HARRIS.